United States Patent [19]

Fey et al.

[11] Patent Number: 5,359,884
[45] Date of Patent: Nov. 1, 1994

[54] DISPLACEMENT SENSOR FOR AN ACTUATING DRIVE IN PARTICULAR IN A VEHICLE

[75] Inventors: Rainer Fey, Schweinfurt; Albert Thein, Hassfurt, both of Germany

[73] Assignee: Fichtel & Sachs AG, Schweinfurt, Germany

[21] Appl. No.: 962,327

[22] Filed: Oct. 15, 1992

[30] Foreign Application Priority Data

Oct. 22, 1991 [DE] Germany .............. 4134794

[51] Int. Cl.⁵ ........................................ G01M 19/00
[52] U.S. Cl. .................................. 73/118.1; 33/1 N
[58] Field of Search ................ 73/118.1, 1 E; 70/237;
74/479 BP, 502.2, 527, 531; 180/287, 79.1, 220;
33/1 N, 1 PT; 123/339, 399; 474/80; 475/153

[56] References Cited

U.S. PATENT DOCUMENTS

| 3,764,162 | 10/1973 | Rawlings | 475/153 |
|---|---|---|---|
| 4,556,116 | 12/1985 | O'Neil | 180/79.1 |
| 4,573,723 | 3/1986 | Morita et al. | 292/336.3 |
| 4,645,024 | 2/1987 | Takabayashi | 180/79.1 |
| 4,660,288 | 4/1987 | Dangschat | 33/1 N X |
| 4,765,425 | 8/1988 | Saito et al. | 180/79.1 |
| 4,809,656 | 3/1989 | Suzuki | 123/399 |
| 4,848,509 | 7/1989 | Bruhnke et al. | 70/237 X |
| 5,165,495 | 11/1992 | Fujii | 180/79.1 |
| 5,178,112 | 1/1993 | Terazawa et al. | 123/399 |

FOREIGN PATENT DOCUMENTS

| 0267423 | 5/1988 | European Pat. Off. . |
| 2247376 | 5/1975 | France . |
| 3703392 | 8/1988 | Germany . |
| 2157387 | 10/1985 | United Kingdom . |
| 8801962 | 3/1988 | WIPO . |

*Primary Examiner*—Robert Raevis
*Attorney, Agent, or Firm*—Brumbaugh, Graves, Donohue & Raymond

[57] ABSTRACT

A displacement sensor for an actuating drive, particularly in a vehicle, having an actuating motor and an especially power takeoff member of the actuating drive, comprising a sensor housing having an axis, a drive member drivable by the actuating motor and rotatably supported coaxially to said sensor housing, an intermediate member, rotatably supported coaxially with respect to said drive member, which intermediate member engages the power take-off member and is connected to the drive member via at least one of an overload clutch and a return stroke clutch and a rotary displacement pick-up means, arranged in said sensor housing and adapted to detect the instantaneous rotary position of the intermediate member and to output a signal indicating this rotary position. This displacement sensor is distinguished by a compact, robust embodiment and high-precision displacement detection.

17 Claims, 1 Drawing Sheet

DISPLACEMENT SENSOR FOR AN ACTUATING DRIVE IN PARTICULAR IN A VEHICLE

BACKGROUND OF THE INVENTION

The invention relates to a displacement sensor for an actuating drive, particularly in a vehicle, having an actuating motor and a power takeoff member of the actuating drive.

Such displacement sensors serve to determine the actual position of the part to be moved by the actuating drive, and to output an actual signal accordingly. If desired, this actual signal can then be supplied to a control device that performs a comparison of the actual and command positions and takes appropriate steps if they do not adequately match, for example by readjusting the actuating drive accordingly until the command position is attained.

OBJECT OF THE INVENTION

In many applications, high precision of the displacement measurement is crucial. In a multi-speed derailleur for a bicycle, for instance, a positioning accuracy of ±0.2 mm, for a total stroke of approximately 40 mm (in an eight-speed derailleur), must be adhered to. The demands made on the displacement sensor of an electrical servo drive for such a derailleur are correspondingly stringent. In addition, a displacement sensor for such applications must be mechanically sturdy and must be capable of being manufactured economically.

It is the object of the invention to provide a displacement sensor that meets these demands.

SUMMARY OF THE INVENTION

This object is attained by a displacement sensor, which is characterized by
a sensor housing having an axis;
a drive member drivable by the actuating motor and rotatably supported coaxially to said sensor housing;
an intermediate member, rotatably supported coaxially with respect to said drive member, which intermediate member engages the power takeoff member and is connected to the drive member via at least one of an overload clutch and a return stroke clutch; and
a rotary displacement pick-up means, arranged in said sensor housing and adapted to detect the instantaneous rotary position of the intermediate member and to output a signal indicating this rotary position.

Since the displacement sensor according to the invention can be incorporated directly into the force path 20 between the actuating motor and the power takeoff member, it necessarily also executes the adjusting motion caused by the actuating drive. Even if the overload clutch disengages instantaneously in response to an excessive load on the actuating drive and is reengaged again later on, possibly in a different mutual rotary position of the clutch members., the displacement sensor continues to detect the accurate position of the part to be moved by the actuating drive, because the displacement sensor is disposed on the force path between the overload clutch and the part to be moved by the actuating drive. The same is true for the displacement sensor with a return-stroke clutch, which can be used particularly in central locking systems for motor vehicles. In such systems, the return stroke enables manual actuation, which otherwise would be more difficult or even impossible because of the stiffness or self-locking of the actuating drive. An advantageously compact embodiment is obtained as well, because of the coaxial disposition of the drive member and the intermediate member.

To further minimize the measurement error of the displacement sensor, it is proposed that a prestressing device is provided, which prestresses the intermediate member in one of its two directions of motion. It is best for the prestressing device to directly engage the part to be adjusted by the actuating drive (for instance, an adjusting parallelogram of the multispeed derailleur). The prestressing is chosen to be so great that all the force transmission parts, between the actuating motor and the part to be adjusted, are always subjected to the prestressing in both directions of motion of the actuating drive and thus, with their teeth, mesh with one another without play. To lower the cost of manufacture and assembly, a certain amount of motional play between successive gear elements is certainly allowable. This motional play has no effect on the accuracy of measurement, however, because the prestressing in both directions of motion prestresses the gear elements in the same way relative to one another.

To further lower the production costs, with a compact overall structure of the displacement sensor and actuating drive, it is proposed that the drive member is a worm wheel which meshes with a worm that is connected to a motor shaft of the actuating motor.

To provide an overload clutch that is simple in structure and can be manufactured at favorable cost, it is proposed that said overload clutch has at least one detent element on one of said intermediate member and said drive member, and a counterpart detent element on the respectively other member, and wherein the detent element upon an overload instantaneously is released from the counterpart detent element to decouple the drive member and the intermediate member.

To this end, it is particularly preferably provided that the detent element is a detent part protruding from said one member, extending parallel to the axis of the intermediate member and being resilient in the radial direction with respect to said axis, which detent part engages a recess provided on an outer or an inner circumference of said other member, forming the counterpart detent element, wherein upon an overload said detent part is forced to move out from said recess. It may also be provided that the detent part has a detent head which engages said other member on that side of said other member which faces away from said one member for the mutual fixation of the two members after said other member has been axially slipped onto the one member.

Because of the embodiment described, only the drive member and the intermediate member must be correspondingly put together axially when the displacement sensor is assembled. A separate mutual axial fixation can be dispensed with, because of the detent heads.

For the rotary displacement pick-up disposed on the intermediate member, various embodiments are possible. For instance, an incremental measuring system can be used, which during the rotary motion scans measuring marks distributed over the circumference of a circle. These 25 measuring marks may be disposed on the rotating intermediate member while the measuring mark scanner is correspondingly stationary, or vice versa. The measuring marks may be visual in nature (bars or the like), or electrical or magnetic in nature. The scanning signals are then counted 30 by a counter of the measuring system, and the counting state indicates the actual position of the part to be monitored. In such a system, however, if the instantaneous counter state should be lost, for instance from a failure of the supply voltage, then it is no longer possible to draw any conclusion as to the instantaneous absolute position of the part to be monitored from the scanning signals. The system must be recalibrated by making a return to a defined zero point, and the counter must be set to zero. However, incremental measuring systems have the advantage, among others, of being suitable for detecting even relatively long adjustment distances.

In accordance with an important further development of the invention, an actuating drive suitable for the absolute detection of even relatively long distances is characterized in that a speed reduction gear is provided between the intermediate member and a pick-up part rotatably supported coaxially with respect to the intermediate member, and wherein said pick-up means detects the instantaneous rotary position of said pick-up part relative to said sensor housing. Because of the speed reduction, a relatively long displacement distance to be detected can be converted to a maximum of a single 360° rotation of the intermediate member, so that from an instantaneous rotary position of the pick-up part, an unequivocal conclusion as to a defined displacement position of the part to be monitored can be drawn.

In order to provide a sturdy, simply manufactured and greatly speed-reducing speed-change gear, it is proposed that the speed reduction gear is embodied by a planetary gear.

To this end, it is preferably provided that the intermediate member is provided with a sun wheel segment, said pick-up part is provided with a planet carrier, said sensor housing is provided with a toothing on an inside circumference, and wherein planet wheels are rotatably supported on said planet carrier and meshing with the sun wheel segment and the toothing.

For the rotary displacement pick-up that detects the absolute rotary position of the pick-up part, various embodiments are possible, such as electrical embodiments with a rotary capacitor or an inductance that is dependent on the rotary angle. For the sake of manufacture at economical cost and of simple signal processing, the use of a rotary potentiometer in the rotary displacement pick-up is especially preferred according to the invention. The signal output by the rotary displacement pick-up is an analog voltage, whose amount is unequivocally associated with the rotary angle. Given a suitably precise resistor contact track, an exact proportionality between the amount of the voltage and the rotary displacement is readily attainable.

A preferred embodiment provides that the sensor part is provided with a circular disk, extending radially with respect to said axis, on one side of said disk the planet wheels are rotatably supported and on the other side of said disk at least one contact track is provided, extending along a circle concentric with said axis and wherein a wiper contact is mounted on said sensor housing. Preferably the wiper contact is a contact pin. Compared with the likewise intrinsically possible alternative embodiment with a stationary contact track and a moving contact pin, the embodiment indicated has the advantage that all the electrical leads, or in other words both the supply voltage and the sensor voltage and optionally the ground connection a well, can be carried via the stationary contact pins.

A compact, mechanically sturdy structure with easy assembly is promoted by providing that the sunwheel is embodied as a hollow wheel. A common bearing shaft for both the intermediate member and the sensor part may also be provided.

The displacement sensor described above is preferably used in combination with an actuating drive, having a power takeoff member embodied as a rack, with which a pinion segment of the intermediate member meshes.

It is especially advantageous to use the actuating drive having a displacement sensor of the above-described type, having an overload clutch, for actuating a bicycle gear system, in particular a derailleur.

To assure the necessary precision of displacement detection here without impairment by the play, it is proposed that the prestressing device engages a mechanism for changing sprocket wheels in the derailleur.

Moreover, the actuating drive with the displacement sensor of the type described, having a return-stroke clutch, can advantageously be used to actuate a central locking system in a motor vehicle.

The various features of novelty which characterise the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENT OF THE INVENTION

Figure 1:
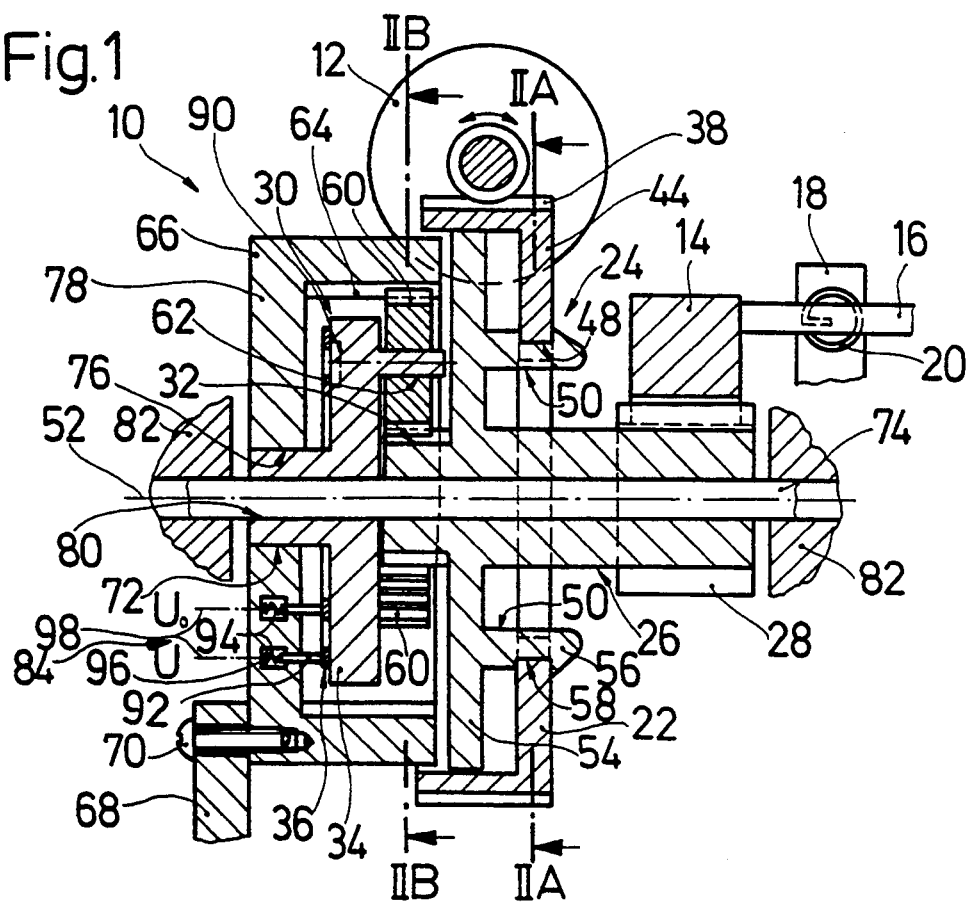
FIG. 1 show a cross section through a displacement sensor according to the invention, having an actuating motor and a power takeoff member.

The displacement sensor described hereinafter and generally identified by reference numeral 10 enables absolute displacement detection with high precision, an is sturdy and suitable for large-scale mass production. It is versatile, being used for instance in vehicles-such as motor vehicles (in combination with a central locking system, for instance), or in bicycles for motor-actuation of a derailleur. In both applications, high reliability at low production cost and low weight are crucial.

The displacement sensor 10 is disposed directly in the force path between an electrical actuating motor 12 shown in simplified form in FIG. 1, and a power takeoff member in the form of a rack 14. This rack is disposed directly together with the part 16 to be adjusted, which for the sake of simplicity is symbolically shown as a crosswise bar in FIG. 1. A prestressing device 20 (symbolized by a helical compression spring) disposed between a stationary counterpart bearing 18 and the part 16 to be adjusted prestresses the part 16 and thus the rack 14 in such a manner that all the elements of the gear between the part 16 and the actuating motor 12 mesh with one another in a prestressed manner, in both of the possible directions of adjustment. Accordingly, the same contact faces, and in particular tooth flanks, of successive parts always contact one another, so that any motional play between successive gear parts does not affect the displacement measurement of the displacement sensor 10.

The displacement sensor 10 includes a drive member 22, which is drivable by the actuating motor 12 and in turn drives an intermediate member 26 via an overload clutch 24. The intermediate member has several functions: first, via a pinion segment 28, it drives directly the rack 14; second, it drives a speed-reducing gear in the form of a planetary gear 30, specifically via a sun wheel segment 32. The planetary gear 30 serves to reduce the speed of the rotary motion of the intermediate member 26 in such a manner that a planet carrier 34 of the planetary gear 30 rotates by somewhat less than 360° during the full displacement of the rack 14. The planet carrier is part of a rotary potentiometer 36. The potentiometer voltage U that is picked up can accordingly always be unequivocally associated with the respective rack position.

The overload clutch 24 prevents damage to parts of the actuating drive or of the device to be adjusted by the actuating drive and connected to it, such as a multispeed derailleur. The overload clutch may be embodied by a pure friction clutch, since any change in the mutual rotary orientation of the clutch parts after an overload does not affect the accuracy of displacement measurement. This is because the displacement sensor 10 detects not the rotary position of the drive motor 12 but rather the actual position of the rack 14 and hence of the part 16 to be adjusted.

Preferably, however, the overload clutch 24 shown in the drawings is used with releasable locking among the clutch parts; this is distinguished by slip-free operation in the normal situation, simple manufacturability, and a readily defined tripping moment.

The drive member 22, in the form of a hollow wheel, is embodied with a worm wheel toothing 38 on its outer circumference, with which a worm 42, attached to a motor shaft 40 of the actuating motor 12 in a manner fixed against relative rotation, meshes. The radially extending bottom 44 of the drive member 22 in the form of a hollow wheel has a central circular opening 46 with a plurality of detent recesses 48, of semicircular shape, for instance. In the exemplary embodiment shown, four such recesses 48 are distributed uniformly over the circumference of the circular opening 46. These detent recesses 48 serve to partially receive pinlike detent parts 50. In the direction parallel to an axis 52, which is common to all the rotating elements of the displacement sensor 10, these detent parts protrude from a radially extending circular disk 54, as part of the intermediate member 26.. The detent parts are embodied as resilient and elastically yielding transversely to their respective longitudinal direction. Upon an overload, the detent parts 50 consequently swivel radially inward, out of the detent recesses 48, so that the drive member 44 and the intermediate member 26 can be rotated relative to one another. Upon a corresponding rotation onward or backward of both parts, the detent parts 50 again lock into place in the detent recesses 48.

In the exemplary embodiment shown, the drive member 44 is slipped in the axial direction onto the intermediate member 26 and then retained by the intermediate member 26. This also produces an especially compact embodiment. As the drawings show, the circular disk 54 of the intermediate member 26, in the installed state, is located inside the hollow wheel opening of the drive member 44; the outer circumference of the circular disk 54 can serve as a bearing face for the inner circumference of the hollow wheel. Beveled detent heads provided on the outer ends of the detent parts serve the purpose of axially fixing the drive member 44 on the intermediate member 26, optionally with the further aid of a recess 58 on each detent part 50 that is adapted to the thickness of the bottom wall 44 of the drive element 22. These parts can be put together readily because of the beveling of the detent heads 48, which decreases radially outward.

The planetary gear 30 serves to reduce the speed of the rotary motion of the intermediate member 26, specifically in such a way that the planet carrier 34 rotates less than 360° during the complete stroke of the motion of the rack 14, so that a defined rack position is unequivocally assigned to each rotary position of the planet carrier 34. The planet carrier 34 comprises a radially extending annular disk, which is adjacent the remainder of the intermediate member 26, and on the right-hand side of which, as seen in FIG. 1, planet wheels 60 (a total of three in the exemplary embodiment shown) are rotatably supported on journals 62. These planet wheels mesh on the one hand with the teeth of the aforementioned sun wheel segment 32 of the intermediate member 26, and on the other with a toothing 64 on the inside circumference of a sensor housing 66 in the form of a hollow wheel. The sensor housing is stationary, as symbolically represented by the attachment of the sensor housing 66 to a housing retainer 68, shown in fragmentary form, by means of a fastening screw 70 at the bottom left in FIG. 1. The drive member 24, which is likewise in the form of a hollow wheel, fits a short way over the sensor housing 66, making for an axially short structure. Also contributing to this structure is the fact that the planet carrier 34 has a bearing collar 72, protruding to the left in FIG. 1, which is penetrated by a common bearing shaft 74 of the planet carrier 34 and the intermediate member 56 and which is inserted into a suitably dimensioned central bearing bore 76 of the hollow wheel bottom 78 of the sensor housing 66. The bearing collar 72 increases the area of the internal bearing face 80, while increasing the resistance to tilting; since it penetrates the bottom wall 78, there is no increase in the axial structural length. The common bearing shaft 74 may be supported on one end or, even better, on two ends, as suggested in FIG. 1 with shaft bearings 82 shown in fragmentary form.

The planet carrier 34 forms a movable sensor part of a rotary displacement pick-up generally identified by reference numeral 84. The rotary displacement pick-up furnishes a signal U indicating the instantaneous rotary position of the planet carrier 34, and from this signal the instantaneous position of the rack 14 can be derived directly. To this end, the rotary displacement pick-up 84 is embodied with the aforementioned rotary potentiometer 36. In the preferred exemplary embodiment shown, the associated contact track 86 is disposed on the moving part (in this case the planet carrier 34), and an associated wiper contact is disposed on the stationary sensor housing 66.

The contact track 86, and a further contact track 88 of reduced diameter, which is acted upon by one of the voltage sources with the initial voltage $U_O$, both extend on the side of the circular-disk-like planet carrier 34 remote from the planet wheels 60, specifically concentrically with the axis 52 defined by the common bearing shaft 74. As indicated in FIG. 1, top, by a connecting line 90, a conductive connection between the contact tracks 86 and 88 exists in one angular position. At a further location, not shown, the contact track 86 is connected to ground potential. Both connection points are preferably located directly side by side, with separation of the contact track 86 between the two connection points. In this way, a variation in the voltage U picked up that is between ground potential and the maximum voltage $U_O$ is obtained with a rotation that is just less than a full 360° rotation (such as 270°, or even better 350°).

In the exemplary embodiment shown, the wiper contacts associated with each of the two contact tracks 86 and 88 are embodied as contact pins 92, which are spring-prestressed (symbolized by compression springs 94 in FIG. 1) in order to rest on the contact tracks, and which are each guided displaceably parallel to the axis 52 in a suitably stepped recess 96 of the bottom 78 of the sensor housing 66. The associated electrical connection lines are each represented in FIG. 1 by a dot-dash line and identified by reference numeral 98.

The above-described arrangement, because of its compact and sturdy embodiment, is especially suitable for dual-wheel derailleurs, as part of an electrical servo drive. Because of the precise displacement detection, the requisite high accuracy of adjustment upon shifting is assured. Because of the advantages discussed, other types of use are also possible. For instance, use in the context of actuating drives in a motor vehicle is also conceivable. A preferred exemplary application is use in a central locking drive mechanism.

In central locking drive systems manual unlocking must generally be possible in the locking position. If for the sake of simplicity a single actuating drive is to be used for positional adjustment between the three positions of unlocked, locking, and central locking, then the actuating drive must be decoupled from the central locking mechanics in the locking position. The reason for this is that the actuating drive is generally made self-locking, or at least stiff. To achieve this decoupling in a simple manner, a return-stroke clutch is provided in addition to or as an alternative to the overload clutch 24. Upon a change from the "unlocked" position to the "locking" position, the actuating drive first moves the locking mechanics out of the "unlocked" position into the "locking position". Next, the actuating drive moves back in the direction of the "unlocked" position, corresponding to the return stroke. If the central locking is now manually moved from the "locking" position into the "unlocked" position, then in this motion, the intermediate member 26 is moved along via the rack 14, and thus the rotary potentiometer 36 of the rotary displacement pick-Up is moved as well. The drive member 22 and the adjoining worm gear with the drive motor 12 are not set in motion, however.

Figure 2:
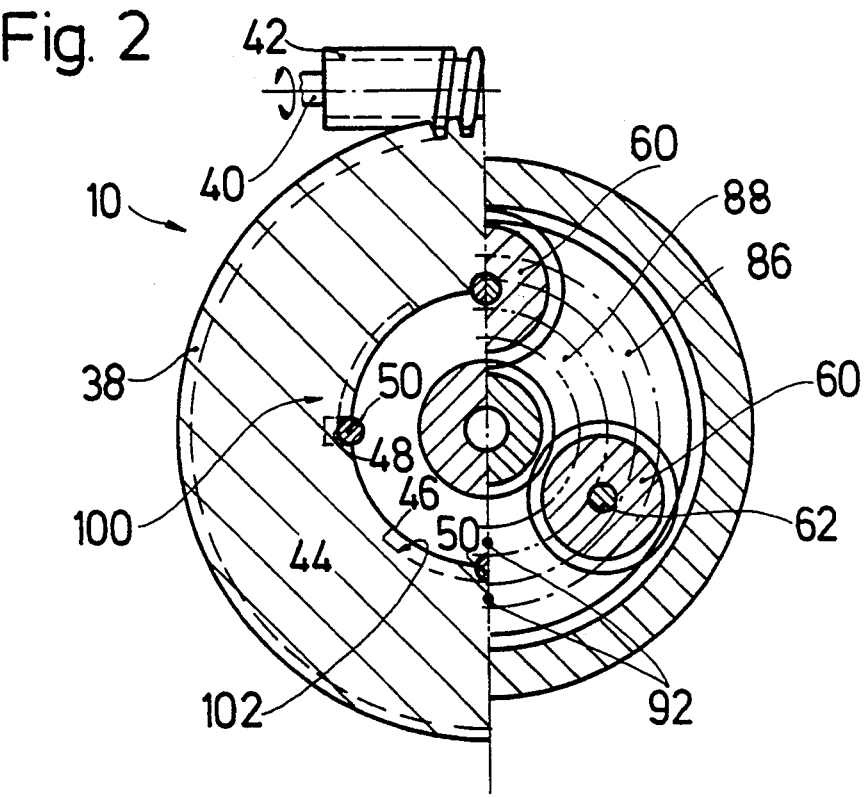
FIG. 2 shows a section through the arrangement of FIG. 1 taken along the line IIA—IIA (left half of FIG. 2) and IIB—IIB (right half).

One possible embodiment of the return-stroke clutch is indicated in the left-hand half of FIG. 2 and identified by reference numeral 100. The return stroke is embodied here by a circumferentially elongated slaving recess 102 shown in dashed lines on the inner circumference of the bottom 44 of the drive member 22 in the form of a hollow wheel; one of the pin-like detent parts 50, having a circular cross section, meshes with a recess. One corresponding curved recess 102 is associated with each of the pins 50, respectively, resulting in a return stroke corresponding to the length of the arc (minus the diameter of the applicable detent part 50). In this embodiment , the return-stroke clutch 100 simultaneously serves as an overload clutch in both possible terminal positions, since as described above, the pins 50 can deflect radially inward in the event of an overload.

The arrangement described above has the advantage that a relatively inexpensive rotary potentiometer 36 can be used, which moreover can be "trimmed" jointly with the pinion segment 28 of the intermediate member 26; in other words, in the assembled state, it can be brought to a predetermined resistance course by suitable reworking of the contact track 86. The accurate position of the rack 14 upon decoupling from an overload or a return-stroke motion is also always detected accurately. Because of the meshing of the components in the form of hollow wheels, as described, a compact embodiment is obtained. Because of the prestressing with the aid of the prestressing device 20, production inaccuracies and in particular motional play between successive gear members does not affect the signal of the rotary displacement pick-up 84. Finally, the absolute position of the rack 14 is also always detected, regardless of any voltage failure that may have occurred in the meantime.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A displacement sensor for an actuating drive, having an actuating motor (12) operatively coupled to a power take-off member (14) for imparting motion to the power take-off member (14), comprising:

a sensor housing (66) having an axis (52);

a drive member (22) drivable by the actuating motor (12) and rotatably supported coaxially to said sensor housing (66);

an intermediate member (26) rotatably supported coaxially with respect to said drive member (22), which intermediate member engages the power takeoff member (14) and is connected to the drive member (22) via at least one of an overload clutch (24) and a return stroke clutch (100);

a rotary displacement pick-up means (84, 34, 60, 36) arranged in said sensor housing (66) for detecting the instantaneous rotary position of the intermediate member (26) and of regenerating a signal (U) indicating said rotary position; and said overload clutch (24) having at least one detent element (50) on one of the intermediate member (26) and the drive member (22), and a counterpart detent element (48) on the other of the intermediate member (26) and the drive member (22), said detent element (50), upon an overload, being released instantaneously from the counterpart detent element (48) to decouple the drive member (22) and the intermediate member (26).

2. The displacement sensor according to claim 1, wherein the detent element is a detent part (50) protruding from said one member (26), extending parallel to the axis (52) of the intermediate member (26) and being resilient in the radial direction with respect to said axis (52), which detent part (50) engages a recess (48) provided on said other member, forming the counterpart detent element, wherein upon an overload the detent part (50) is forced to move out from said recess (48).

3. The displacement sensor according to claim 2, wherein the detent part (50) is provided with a detent head (56) which engages said other member (22) on the side of said other member (22) which faces away from said one member (26) for the mutual fixation of the one member (26) and the other member (22) after said other member (22) has been axially slipped onto said one member.

4. A displacement sensor for an actuating drive, having an actuating motor (12) operatively coupled to a power take-off member (14) for moving the take-off member through a range of motion, comprising:
   a sensor housing (66) having an axis (52);
   a drive member (22) drivably coupled to the actuating motor (12) and rotatably supported coaxially with said sensor housing (66);
   an intermediate member (26) rotatably supported coaxially with said drive member (22), which intermediate member drivably engages the power take-off member (14) and is connected to the drive member (22) via at least one of an overload clutch (24) and a return stroke clutch (100);
   a pick-up part (34) rotatably supported coaxially with the intermediate member (26);
   speed reduction gear means (30) operatively interposed between the intermediate member (26) and the pick-up part (34) for limiting the rotation of the pick-up part (34) to less than one full revolution during the complete range of motion of the power take-off member (14); and
   rotary displacement pick-up means (84, 34, 60, 36) arranged in said sensor housing (66) for detecting the instantaneous rotary position of the pick-up part (34) relative to said sensor housing (66) and for generating a signal (U) indicating said rotary position, whereby said signal (U) represents an instantaneous position of said power take-off member (14).

5. The displacement sensor according to claim 4, wherein the speed reduction gear means comprises a planetary gear (30).

6. The displacement sensor according to claim 5, wherein the intermediate member (26) is provided with a sun wheel segment (32), said pick-up part compresses a planet carrier (34), said sensor housing (66) is provided with a toothing (64) on an inside circumference, and wherein planet wheels (60) are rotatably supported on said planet carrier (34) and mesh with the sun wheel segment (32) and the toothing (64).

7. The displacement sensor according to claim 4, wherein both the intermediate member (26) and the pick-up part are carried by a common bearing shaft (74).

8. The displacement sensor according to claim 4, wherein said pick-up means (84) includes a rotary potentiometer (36).

9. The displacement sensor according to claim 8, wherein:
   said speed reduction gear means (30) comprises a planetary gear including a sun gear segment (32) carried by said intermediate member (26), a disk-shaped planet gear carrier (34) rotatably supported coaxially with said axis (52), and a plurality of planet gears (60) rotatably mounted on one axial side of said disk-shaped planet carrier and meshing with said sun gear segment (32); and
   said potentiometer includes at least one generally circular contact track (86, 88) provided on the other axial side of said disk-shaped planet carrier (34) in coaxial relation to said axis (52) and at least one wiper contact (92) provided on said sensor housing (66).

10. The displacement sensor according to claim 9, wherein said wiper contact is a contact pin (92).

11. The displacement sensor according to claim 4, wherein:
   said intermediate member (26) is rotatably supported for two directions of motion; and
   said sensor further comprises a prestressing device (20) which prestresses the intermediate member (26) in one of its two directions of motion.

12. The displacement sensor according to claim 4, wherein said drive member (22) comprises a worm wheel (22) which meshes with a worm (42) connected to a shaft (40) of the actuating motor (12).

13. The displacement sensor according to claim 4, wherein said sensor housing (66) comprises a hollow wheel.

14. The displacement sensor according to claim 4, wherein the power take-off member (14) comprises a rack which meshes with a pinion segment of the intermediate member (26).

15. A displacement sensor for an actuating drive, having an actuating motor (12) operatively coupled to a power take-off member (14) for imparting motion to the power take-off member (14), comprising:
   a sensor housing (66) having an axis (52);
   a drive member (22) drivable by the actuating motor (12) and rotatably supported coaxially to said sensor housing (66);
   an intermediate member (26) rotatably supported coaxially with respect to said drive member (22), which intermediate member engages the power takeoff member (14) and is connected to the drive member (22) via at least one of an overload clutch (24) and a return stroke clutch (100); and
   a rotary displacement pick-up means (84, 34, 60, 36) arranged in said sensor housing (66) for detecting the instantaneous rotary position of the intermediate member (24) and for generating a signal (U) indicating said rotary position;
   wherein said overload clutch (24) actuates a bicycle gear system.

16. A displacement sensor for an actuating drive, having an actuating motor (12) operatively coupled to a power take-off member (14) for imparting motion to the power take-off member (14), comprising:
   a sensor housing (66) having an axis (52);
   a drive member (22) drivable by the actuating motor (12) and rotatably supported coaxially to said sensor housing (66);
   an intermediate member (26) rotatably supported coaxially with respect to said drive member (22), which intermediate member engages the power takeoff member (14) and is connected to the drive member (22) via at least one of an overload clutch (24) and a return stroke clutch (100), wherein the intermediate member (26) has two directions of motion;
   a rotary displacement pick-up means (84, 34, 60, 36) arranged in said sensor housing (66) for detecting the instantaneous rotary position of the intermediate member (24) and for generating a signal (U) indicating said rotary position; and
   a prestressing device (20) which prestresses the intermediate member (26) in one of its two directions of motion and which engages a mechanism for changing sprocket wheels in a derailleur.

17. A displacement sensor for an actuating drive, having an actuating motor (12) operatively coupled to a power take-off member (14) for imparting motion to the power take-off member (14), comprising:
- a sensor housing (66) having an axis (52);
- a drive member (22) drivably by the actuating motor (12) and rotatably supported coaxially to said sensor housing (66);
- an intermediate member (26) rotatably supported coaxially with respect to said drive member (22), which intermediate member engages the power takeoff member (14) and is connected to the drive member (22) via at least one of an overload clutch (24) and a return stroke clutch (100); and
- a rotary displacement pick-up means (84, 34, 60, 36) arranged in said sensor housing (66) for detecting the instantaneous rotary position of the intermediate member (24) and for generating a signal (U) indicating said rotary position;
- wherein said return stroke clutch (100) actuates a central locking system in a motor vehicle.

* * * * *

UNITED STATES PATENT AND TRADEMARK OFFICE
CERTIFICATE OF CORRECTION

PATENT NO. : 5,359,884
DATED : November 1, 1994
INVENTOR(S) : Rainer Fey and Albert Thein It is certified that error appears in the above-indentified patent and that said Letters Patent is hereby corrected as shown below:

Col. 2, line 62, "These 25" should read --These--;
Col. 4, line 31, "show" should read --shows--;
Col. 4, line 43, "an" should read --and--;
Col. 5, line 6, "in the 30" should read --in the--;
Col. 6, line 15, "adjacent" should read --adjacent to--;
Col. 6, line 35, "56" should read --26--;
Col. 7, line 50, "pick-Up" should read --pick-up--;
Col. 9, line 5, "member." should read --member (26).--;
Col. 9, line 41, "compresses" should read --comprises--;
Col. 11, line 4, "drivably" should read --drivable--.

Signed and Sealed this

Twenty-first Day of February, 1995

Attest:

BRUCE LEHMAN

*Attesting Officer*  *Commissioner of Patents and Trademarks*